(12) United States Patent
Garot et al.

(10) Patent No.: US 12,467,690 B2
(45) Date of Patent: Nov. 11, 2025

(54) REFRACTORY ANCHOR

(71) Applicant: Silicon Refractory Anchoring Systems B.V., Wateringen (NL)

(72) Inventors: Danielle Francesca Garot, Wateringen (NL); Jerome Michael Garot, Wateringen (NL); Koen Van Mil, Wateringen (NL)

(73) Assignee: SILICON HOLDINGS B.V., 'S-Gravenhage (NL)

( * ) Notice: Subject to any disclaimer, the term of this patent is extended or adjusted under 35 U.S.C. 154(b) by 416 days.

(21) Appl. No.: 18/009,170

(22) PCT Filed: Jun. 17, 2021

(86) PCT No.: PCT/NL2021/050380
§ 371 (c)(1),
(2) Date: Dec. 8, 2022

(87) PCT Pub. No.: WO2021/256927
PCT Pub. Date: Dec. 23, 2021

(65) Prior Publication Data
US 2023/0235962 A1   Jul. 27, 2023

(30) Foreign Application Priority Data
Jun. 19, 2020  (NL) .................................... 2025862

(51) Int. Cl.
 *F27D 1/14*  (2006.01)
(52) U.S. Cl.
 CPC ............. *F27D 1/141* (2013.01); *F27D 1/145* (2013.01)

(58) Field of Classification Search
 CPC .................................. F27D 1/142; F23M 5/04
 See application file for complete search history.

(56) References Cited

U.S. PATENT DOCUMENTS

| | | | | |
|---|---|---|---|---|
| 1,962,906 A * | 6/1934 | Mueller | ................. | E04H 12/28 |
| | | | | 52/564 |
| 3,019,864 A * | 2/1962 | Lester | ..................... | F23M 5/00 |
| | | | | 52/787.11 |
| 3,587,198 A * | 6/1971 | Hensel et al. | ....... | G21C 11/081 |
| | | | | 264/269 |
| 4,651,487 A * | 3/1987 | Nishikawa | .............. | F27D 1/141 |
| | | | | 52/378 |
| 4,660,343 A * | 4/1987 | Raycher | .................. | F16L 59/12 |
| | | | | 52/378 |
| 4,711,186 A * | 12/1987 | Chen | ................... | B01J 19/0053 |
| | | | | 52/378 |

(Continued)

OTHER PUBLICATIONS

International Search Report (ISR) for PCT/NL2021/050380 mailed Sep. 27, 2021 (3 pages).

(Continued)

*Primary Examiner* — Joshua K Ihezie
(74) *Attorney, Agent, or Firm* — SHUMAKER, LOOP & KENDRICK, LLP

(57) ABSTRACT

A refractory anchor including an elongated mounting pin having a first end and a second end opposite to the first end seen in the longitudinal direction of the elongated mounting pin, wherein the first end of the elongated mounting pin is configured to be weldable to an object, and an assembly including an object and the refractory anchor, and to a method for providing the assembly.

22 Claims, 7 Drawing Sheets

(56) References Cited

U.S. PATENT DOCUMENTS

| | | | | |
|---|---|---|---|---|
| D375,892 S | * | 11/1996 | Kraemer, Jr. | D8/384 |
| 6,393,789 B1 | * | 5/2002 | Lanclos | F27D 1/141 |
| | | | | 52/378 |
| 6,887,551 B2 | * | 5/2005 | Hyde | B32B 3/12 |
| | | | | 110/340 |
| 9,861,949 B2 | * | 1/2018 | Simon | F23M 5/04 |
| 10,190,314 B2 | * | 1/2019 | Garot | B23K 1/0008 |
| 10,352,619 B2 | * | 7/2019 | Yoder | B01J 19/0053 |
| 10,907,899 B1 | * | 2/2021 | Lanclos | F27D 1/004 |
| 2004/0226251 A1 | * | 11/2004 | Hyde | E04F 15/082 |
| | | | | 52/674 |
| 2015/0267122 A1 | * | 9/2015 | Hinson | C10B 39/06 |
| | | | | 422/241 |
| 2016/0047124 A1 | | 2/2016 | Garot et al. | |
| 2018/0320973 A1 | * | 11/2018 | Yoder | B01J 19/0053 |
| 2018/0345401 A1 | * | 12/2018 | Giaramita | F27D 1/141 |
| 2022/0205720 A1 | * | 6/2022 | Garot | F27D 1/141 |

OTHER PUBLICATIONS

Written Opinion (WO) for PCT/NL2021/050380 mailed Sep. 27, 2021 (6 pages).

* cited by examiner

REFRACTORY ANCHOR

TECHNICAL FIELD AND BACKGROUND

The invention relates to a refractory anchor comprising an elongated mounting pin having a first end and a second end opposite to the first end seen in the longitudinal direction of the elongated mounting pin, wherein the first end of the elongated mounting pin is configured to be weldable to an object. The invention also relates to an assembly comprising an object and the refractory anchor, and to a method for providing the assembly, and to a method for providing equipment protection using at least one refractory anchor.

Such a refractory anchor is known from US 2016/0047124 A1. The application field of the refractory anchor according to the present specification is different than the known refractory anchor, i.e. the total height of the refractory anchor known from US 2016/0047124 A1 is relatively small such that this known refractory anchor is less suitable for anchoring a liner having thickness larger than 80 mm. The total height of the refractory anchor is provided between the highest top side, i.e. the top sides of the anchor fins as shown with reference sign 2 in FIG. 1 of US 2016/0047124 A1, and the first end of the elongated mounting pin configured to be weldable to an object. Thus, it is an object of the present invention to provide an improved refractory anchor having a configuration to provide a relatively large total height for anchoring a liner having a relatively large thickness. In one aspect the improved refractory anchor is better to withstand loads and/or relatively high temperatures despite its relatively large total height, in particular for long term use for securing a relatively thick refractory lining in high-temperature and abrasive/erosive environments.

SUMMARY

The refractory anchor comprises an elongated mounting pin having a first end and a second end opposite to the first end seen in the longitudinal direction of the elongated mounting pin, wherein the first end of the elongated mounting pin is configured to be weldable to an object. The refractory anchor further comprises an anchor body. At least the second end of the elongated mounting pin is connected to a central portion of the anchor body which further comprises at least two side sections extending from the central portion. The central portion and/or at least one of the at least two side sections of the anchor body of the refractory anchor mainly extend above the second end of the elongated mounting pin seen in the longitudinal direction of the elongated mounting pin. An upper side of the anchor body facing away from the second end of the elongated mounting pin is provided with an open cut-out which is located directly above the elongated mounting pin seen in the longitudinal direction of the elongated mounting pin.

The refractory anchor is configured to be installed to an object such as a wall section of thermal-process vessels used in oil refineries and other petrochemical and chemical process facilities having highly abrasive and high-temperature environments. After installation of the refractory anchor(s) to the object, lining material in liquid form is applied to the object. Normally the cured lining material forms a relatively thin layer on the object, wherein the lining material is secured to the object by the refractory anchor(s). For example, the anchoring assembly known from US 2016/0047124 A1 is especially useful for anchoring a liner having thickness of about 30 mm-80 mm, preferably around 50 mm.

The inventors have found out that a new basic design of the refractory anchor provides excellent and long-lasting results for anchoring relatively thick lining material for improved protecting equipment against a high temperature, erosive and/or abrasive environment as a result of processes occurring inside vessels, conduits, cyclones and other installations. By providing an anchor body connected to one of the two ends of the elongated mounting pin, hereafter the second end of the elongated mounting pin, wherein a central portion and/or at least one of the at least two side sections of the anchor body of the refractory anchor seen in the longitudinal direction of the elongated mounting pin mainly extend above the second end of the elongated mounting pin connected to the anchor body, a refractory anchor may be obtained having a relatively large height. To provide excellent and long-lasting results for anchoring relatively thick lining material, the new basic design of the refractory anchor comprises an upper side of the anchor body facing away from the second end of the elongated mounting pin, wherein the upper side is provided with an open cut-out which is located directly above the elongated mounting pin seen in the longitudinal direction of the elongated mounting pin. It is important that the cut-out is open towards the upper side of the anchor body, such that the cut-out enhances the flow of lining material, i.e. refractory cement, in the direction of the elongated mounting pin, such that the risk of cavities in the lining material close to the refractory anchor with a relatively large total height and/or between the object and a lower side of the anchor body of the refractory anchor, in particular the liner after installation, is minimized and/or reduced drastically. In addition, it is also important that the cut-out is located directly above the elongated mounting pin seen in the longitudinal direction of the elongated mounting pin, such that the cut-out provides more flexibility to the refractory anchor having the relatively large height during use in highly abrasive/erosive and high-temperature environments, such that the risk of deformation of the refractory anchor is minimized as a results of the loads provided on the refractory anchor during use, for example as a result of internal thermal stress created by high temperatures. Further, the recess is filled with lining material after installation, such that there is a reduced heat transfer path between the (hot) upper side of the recess and the elongated mounting pin. After installation, the upper side of the anchor body is facing the "hot" side.

Further, the refractory anchor may be welded, preferably by stud welding, to the object by means of the elongated mounting pin in a relatively fast manner. Hence, the refractory anchor disclosed in this document provides advantages for anchoring relatively thick liners with respect to installation time of the refractory anchor, anchoring quality of the liner after installation and ability to provide long-lasting results in high-temperature and abrasive/erosive environments. The refractory anchor is particularly suited for lining material having densities starting from 2.0 g/cm$^3$ (normally referred to as medium weight lining material) or even starting from 2.5 g/cm$^3$ (normally referred to as heavy weight lining material). Further, the refractory anchor is also configured for dual lining applications, i.e. a first lining layer mainly for temperature insulation of the object and a second, normally thinner, top liner layer for protection against abrasion.

The word height refers in this document to a direction coinciding or extending parallel to the longitudinal direction of the elongated mounting body, wherein the longitudinal direction extends in the same direction as the virtual center line of the elongated mounting pin. Further, the terms "width" or "thickness/diameter" refer to one direction extending from the longitudinal direction in a plane traverse to the longitudinal direction of the elongated mounting pin.

In one aspect of the refractory anchor the distance between edges of the upper side defining the open cut-out in the anchor body corresponds to or is larger than the thickness/diameter of the elongated mounting pin, preferably the distance between the edges of the upper side defining the open cut-out in the anchor body is at least two times the thickness/diameter of the elongated mounting pin. In addition, the center of the open cut-out located at the same level as the upper side of the anchor body may coincide with the virtual center line of the elongated mounting pin. Further, seen in the longitudinal direction of the elongated mounting pin the height of the cut-out may correspond to or may be larger than the thickness/diameter of the elongated mounting pin. Such a configuration of the cut-out may further enhance the flow of lining material during installation and/or may further provide the desired flexibility to the refractory anchor during use in highly abrasive/erosive and high-temperature environments.

The total height of the refractory anchor may be further increased by providing at least one section of the central portion of the anchor body extending between the cut-out and the second end of the mounting pin.

In a further aspect, the thickness/diameter of the elongated mounting pin corresponds to or is larger than 10 mm, wherein the height of the elongated mounting pin corresponds to or is larger than 40 mm, and/or the height/distance between the upper side of the anchor body and the first end of the elongated mounting pin is at least 80 mm. Further, the maximum height of the anchor body may be larger than the height of the elongated mounting pin.

The central portion of the anchor may be provided with at least one further cut-out located between the open cut-out and the second end of the elongated mounting pin. The center of the further cut-out may coincide with the virtual center line of the elongated mounting pin. The further cut-out(s) may be configured in a mirror-symmetrical manner with respect to the virtual center line of the elongated mounting pin. The further cut-out may by an endless cut-out part and/or the further cut-out may be a cut-out extension extending from the open cut-out. The endless cut-out part contributes to increasing the total height of the refractor anchor, in providing a more flexible refractory anchor and in providing a refractory anchor which secures the lining material to the object in an improved manner. The endless cut-out part may be formed as a hole in the central portion of the anchor body. The cut-out extension mainly contributes in providing a more flexible refractory anchor, in particular the cut-out extension minimizes buckling of the refractory anchor due to the internal thermal stresses created by high temperatures. The cut-out extension may have a first elongated section having a minimal width seen in a direction traverse to the virtual center line of the elongated mounting pin, wherein the first elongated section starts from the open cut-out and ends in a second section located closer to the second end of the elongated mounting pin than the first elongated section, wherein the second section has a larger width than the first elongated section, preferably the center line of the cut-out extension coincides with the center line of the elongated mounting pin. The protection provided by the cut-out extension against buckling makes it possible to reduce the thickness of the plate shaped anchor body such that material savings can be obtained.

A free side of at least one of the two side sections facing away from the elongated mounting pin may comprise at least one recess such that the shortest distance between the virtual center line of the elongated mounting pin and a corner between the free side and the upper side is larger than the shortest distance between the virtual center line of the elongated mounting pin and a middle section of the at least one recess. The at least one recess prevents or reduces heat transfer between two adjacent positioned refractory anchors. Further, the at least one recess may facilitate providing improved anchoring results of the liner.

At least the lower corners of the anchor body may be rounded. After installation of the refractory anchor, the lower corners of the anchor body, i.e. the corners having a relatively small distance to the object seen in the longitudinal direction of the elongated mounting pin, are buried completely and relatively deep in the lining material, i.e. (much) deeper than the upper corners which may be approximately flush with the lining material or only minimally buried in the lining material. The rounded lower corners of the anchor body reduce the risks of cracks in the (cured) liner compared to conventional straight corners drastically, because in use the refractory anchor may experience vibrations and as a result of these vibrations sharp corners like the straight corners are able to cut into the cured lining material which may provide cracks/bursts relatively deep in the liner after a certain period of use. It is also advantageously for the same reasons to provide rounded corners in the anchor body below the upper side of the anchor body, for example corners as a result of the at least one recess provided in the free side of at least one of the two side sections facing away from the elongated mounting pin.

Further, the elongated mounting pin may be advantageously made from a different material than the anchor body. More specific, the elongated mounting pin may be made from a first alloy and the one-piece anchor body may be made from a second alloy different from the first alloy. The first alloy is for example configured for optimal welding results of the elongated mounting pin to an object such as for example a backing plate or a wall of a vessel. It is not unusual that such a first alloy is more sensitive to high temperatures after installation and during use than the second alloy, wherein the recess located directly above the elongated mounting pin and filled with lining material provides additional protection to the elongated mounting pin as a result of the temperature insulation characteristics of the lining material. The anchor body may made of a second alloy different from the first alloy, wherein the second alloy is configured for providing optimal anchoring results of the liner and/or for providing maximum protection against the high temperature and/or abrasive environment of processes occurring inside the vessel/cyclone. The elongated mounting pin is advantageously made of a material configured for stud welding the elongated mounting pin to an object, for example a metal object such as a metal plate. Hence, by using stud welding technique, the installation time of the refractory anchors is relatively fast, in particular compared to hand welding or spot welding.

The elongated mounting pin may comprise a first portion comprising the first end of the elongated mounting pin and a second portion comprising the second end of the elongated mounting pin, wherein the thickness/diameter of the second portion is larger than the thickness/diameter of the first portion. The larger thickness/diameter of the second portion facilitates the welding process for connecting the anchor body to the mounting pin and facilitates to obtain a stronger connection between the anchor body and the mounting pin. The second portion of the elongated mounting pin may further comprise a through groove adapted to receive a part of the central portion of the anchor body with almost no play, preferably the central portion of the anchor body is plate shaped. This through groove may further assist an operator in obtaining a relatively strong connection between the anchor body and the mounting body. The through groove may also facilitate the welding process to obtain the connection.

It is a further goal to provide an improved assembly comprising an object such as a metal plate and a refractory anchor. This goal is achieved with the claim directed to an assembly. The refractory anchor has been welded on the object, preferably by stud welding. In the assembly, a minimum distance (height) between a lower side of the anchor body and the object may correspond at least to the thickness/diameter of the elongated mounting pin, wherein the maximum distance (height) between a lower side of the anchor body and the object corresponds at least to two times the thickness/diameter of the elongated mounting pin, preferably the portion of the lower side of the anchor body having the maximum distance to the object is located closer to the elongated mounting pin than the portion of the lower side of the anchor body having the minimum distance to the object. This (minimal and maximum) distance (height) between the lower side of the anchor body and the object contributes during installation of the lining material that lining material in liquid form is free to flow under the anchor body between the anchor body and the object to obtain excellent and long-lasting lining results. The maximum distance close to or adjacent the mounting pin further improves the flow of the liquid lining material and reduces after installation a direct or relatively large heat path between an upper side of the anchor body and the first end of the elongated mounting pin weldable or welded to the object, such that a refractory anchor provides an improved configuration to withstand high temperatures on the "hot side" of the refractory anchor.

The maximum height between the upper side of the anchor body and the object is at least 80 mm, preferably at least 100 mm.

It is also an object to provide a method for providing the above assembly. This object is achieved according to the claim directed to a method. The elongated mounting pin of the refractory anchor is connected to the object by stud welding, preferably drawn arc stud welding. By using refractory anchors in the method various patterns can be provided, such as for example patterns comprising an open or closed hexagonal shape between the refractory anchors.

It is further an object to provide a method for providing improved equipment protection using at least one refractory anchor as disclosed in this document, wherein the at least one refractory anchor has been welded to an object of the equipment, preferably by stud welding, wherein after welding the at least one refractory anchor lining material in liquid form is applied to the object, wherein the lining material is secured to the object by the at least one refractory anchor, wherein lining material has a density starting from 2.0 g/cm³ and/or starting from 2.5 g/cm³

In one aspect of this method, dual lining may be applied to the object to provide a first lining layer mainly for temperature insulation of the object and a second, preferably thinner, top liner layer for protection against abrasion, wherein the first lining layer is located closer to the object than the second top liner layer.

BRIEF DESCRIPTION OF THE DRAWINGS

The present invention will be explained in more detail below with reference to the appended figures showing exemplary embodiments of a refractory anchor and exemplary embodiments of an assembly.

DETAILED DESCRIPTION

Figure 1A:
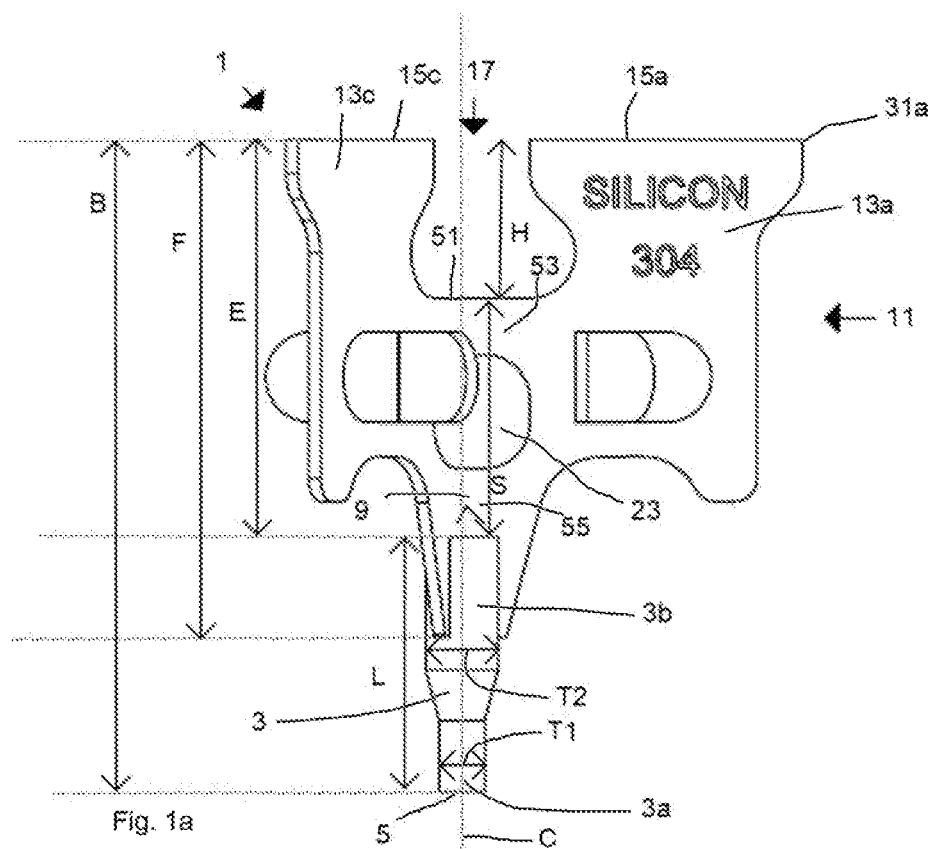
FIGS. 1a, 1b, and 1c show perspective views and a top view of a first embodiment of a refractory anchor.
Figure 1B:
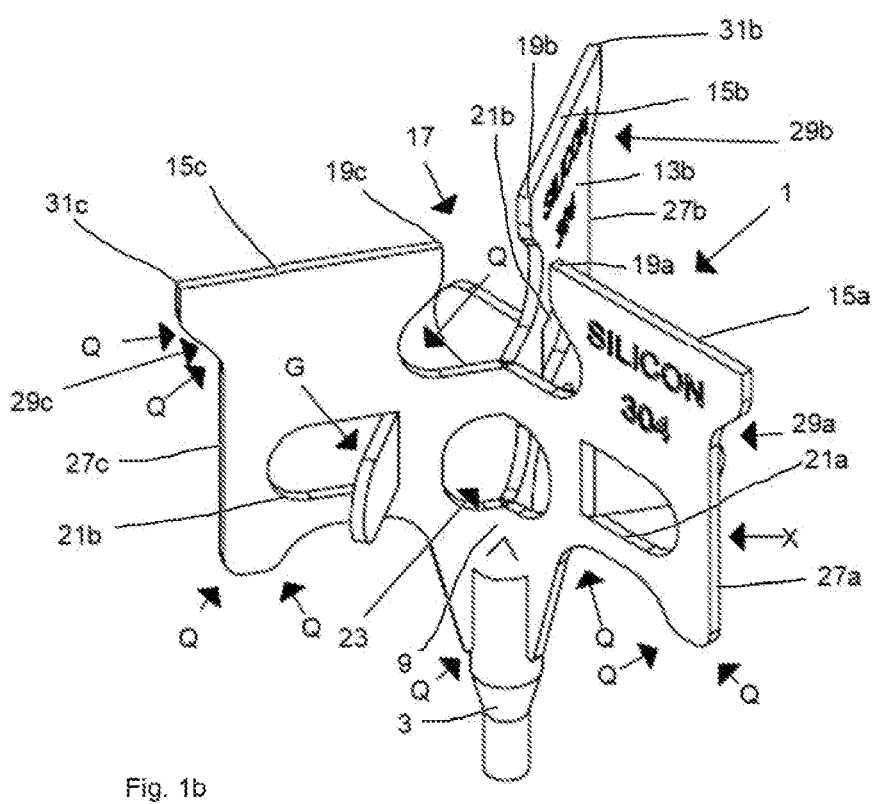
Figure 1C:
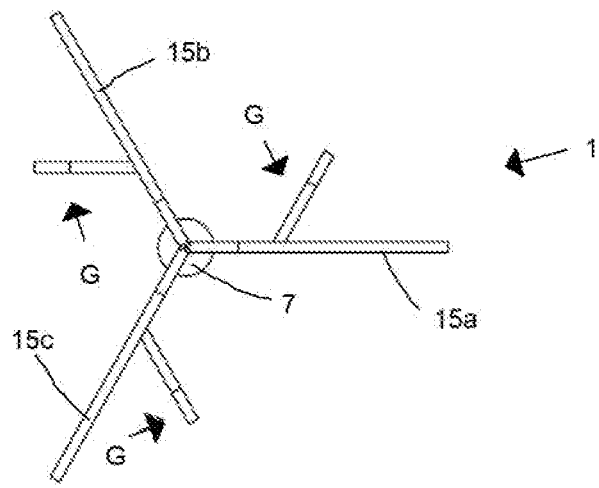

Like parts are indicated by the same reference signs in the various figures. Each feature disclosed with reference to the figure can also be combined with another feature disclosed in this disclosure including the claims, unless it is evident for a person skilled in the art that these features are incompatible.

The various refractory anchors and assemblies shown in the FIGS. 1a-c-9 have a corresponding basis design as will be explained hereafter before explaining the differences between the various embodiments shown more in detail.

The refractory anchors 1; 101; 101'; 201; 301; 201'; 201"; 301' shown in the FIGS. 1a-c-9 each comprise an elongated mounting pin 3; 103; 103'; 203; 303; 203'; 203"; 303' having a first end 5; 105; 105'; 205; 305; 205'; 205"; 305' and a second end 7; 107; 107'; 207; 307; 207'; 207"; 307' opposite to the first end seen in the longitudinal direction, indicated by arrow L. of the elongated mounting pin, wherein the first end of the elongated mounting pin is configured to be weldable to an object 1000; 1000', and at least the second end of the elongated mounting pin is connected to a central portion 9; 109; 109'; 209; 309; 209'; 209"; 309' of an anchor body 11; 111; 111'; 211; 311; 211'; 211"; 311' which further comprises at least two side sections 13a-c; 113a-b; 113'a-b; 213a-b; 313a-b; 213'a-b; 213"a-b; 313'a-b extending from the central portion, i.e. extending radially outwardly with respect to the center line indicated by line C of the elongated mounting pin, wherein the central portion and/or at least one of the at least two side sections 13a-c; 113a-b; 113'a-b; 213a; 313a-b; 213'a; 213"a; 313'a-b of the anchor body of the refractory anchor mainly extend (indicated with arrows E) above the second end of the elongated mounting pin seen in the longitudinal direction of the elongated mounting pin, wherein an upper side 15a-c; 115a-b; 115'a-b; 215a-b; 315a-b; 215'a-b; 215"a-b; 315'a-b of the anchor body facing away from the second end of the elongated mounting pin is provided with an open cut-out 17; 117; 117'; 217; 317; 217'; 217"; 317' which is located directly above the elongated mounting pin seen in the longitudinal direction of the elongated mounting pin.

The distance between edges 19a-c; 119a-b; 119'a-b; 219a-b; 319a-b; 219'a-b; 219"a-b; 319'a-b of the upper side defining the open cut-out in the anchor body corresponds to or is larger than the thickness/diameter T1 of the elongated mounting pin, preferably the distance between the edges of the upper side defining the open cut-out in the anchor body is at least two times the thickness/diameter T1 of the elongated mounting pin. The center of the open cut-out located flush with, i.e. at the same level as, the upper side of the anchor body coincides with the virtual center line C of the elongated mounting pin. Seen in the longitudinal direction of the elongated mounting pin the height H of the cut-out corresponds to or is larger than the thickness/diameter T1 of the elongated mounting pin. Further, at least a section (indicated by arrows S) of the central portion of the anchor body extends between the cut-out and the second end of the mounting pin. The thickness/diameter T1 of the elongated mounting pin corresponds to or is larger than 10 mm, wherein the height of the elongated mounting pin (also indicated with arrows L) corresponds to or is larger than 40 mm, preferably the height/distance, indicated with arrows B, i.e. the total height of the refractory anchor, between the upper side of the anchor body and the first end of the elongated mounting pin is at least 80 mm, preferably at least 100 mm. The maximum height indicated by arrows F of the anchor body is larger than the height L of the elongated mounting pin. As can be seen, in the refractory anchor 1; 101; 101'; 201; 301; 201'; 201"; 301' shown in the drawings, the maximum height F minus the height E of the portion of the anchor body extending above the second end of the elongated mounting pin results in a value which is smaller than height E. Hence, as long as this value is smaller than the height E, the central portion and/or the side section(s) mainly extend above the second end of the elongated mounting pin seen in the longitudinal direction of the elongated mounting pin.

The anchor body of the refractory anchor 1; 101; 101'; 201; 301; 201'; 201"; 301' comprises at least one endless cut-out part, including two or more endless cut-out parts 21*a-c*; 121*a-f*; 121'*a-d*; 221*a-e*; 321*a-b*; 221'*a-e*; 221"*a-e*; 321'*a-b*. The endless cut-out parts may be cut in the plate like anchor body, more in particular cut in the side sections 13*a-c*; 113*a-b*; 113'*a-b*; 213*a-b*; 313*a-b*; 213'*a-b*; 213"*a-b*; 313'*a-b*. The cutting line for providing the endless cut-out parts may be provided in a non-endless manner such that a tab indicated with letter G in the drawings can be provided, wherein the tabs contribute in improving anchoring results with the liner (not shown). The tab G has an acute angle with the third anchor fin section. The cut-out parts have the same shape as the tabs as is shown in the figures, i.e. each tab and each associated cut-out part have a U-shape.

The central portion 9; 109; 109'; 209; 309; 209'; 209"; 309' of the anchor body 11; 111; 111'; 211; 311; 211'; 211"; 311' is provided with at least one further cut-out 23; 123, 125; 125'; 225; 325; 225'; 225"; 325' located between the open cut-out and the second end of the elongated mounting pin. A center of the further cut-out coincides with the virtual center line C of the elongated mounting pin. The further cut-out is an endless cut-out part 23; 123, preferably the maximum dimension of the endless cut-out part 23; 123 between two opposing points on an inner wall corresponds to or is larger than the thickness/diameter T1 of the elongated mounting pin, and/or the further cut-out is an cut-out extension 125; 125'; 225; 325; 225'; 225"; 325' extending from the open cut-out. The cut-out extension 125; 125'; 225; 325; 225'; 225"; 325' has a first elongated section 125*a*; 125'*a*; 225*a*; 325*a*; 225'*a*; 225"*a*; 325'*a* having a minimal width seen in a direction traverse (this direction corresponds to the direction indicated by arrow T1) to the virtual center line C of the elongated mounting pin, wherein the first elongated section starts from the open cut-out and ends in a second section 125*b*; 125'*b*; 225*b*; 325*b*; 225'*b*; 225"*b*; 325'*b* located closer to the second end of the elongated mounting pin than the first elongated section, wherein the second section has a larger width than the first elongated section. The center line of the cut-out extension coincides with the center line C of the elongated mounting pin.

A free side 27*a-c*; 127*a-b*; 127'*a-b*; 227*a*; 327*a-b*; 227'*a*; 227"*a*; 327'*a-b* of at least one of the two side sections facing away from the elongated mounting pin comprises at least one recess 29*a-c*; 129*a-b*; 129'*a-b*; 229*a*; 329*a-b*; 229'*a*; 229"*a*; 329'*a-b* such that the shortest distance between the virtual center line C of the elongated mounting pin and a corner 31*a-c*; 131*a-b*; 131'*a-b*; 231*a*; 331*a-b*; 231'*a*; 231"*a*; 331'*a-b* between the free side and the upper side is larger than the shortest distance between the virtual center line C of the elongated mounting pin and a middle section indicated with letter X of the at least one recess.

At least the lower corners, corners indicated with letter Q of the anchor body 11; 111; 111'; 211; 311; 211'; 211"; 311' shown in the appended drawings are rounded.

The elongated mounting pin 3; 103; 103'; 203; 303; 203'; 203"; 303' comprises a first portion 3*a*; 103*a*; 103'*a*; 203*a*; 303*a*; 203'*a*; 203"*a*; 303'*a* comprising the first end of the elongated mounting pin and a second portion 3*b*; 103*b*; 103'*b*; 203*b*; 303*b*; 203'*b*; 203"*b*; 303'*b* comprising the second end of the elongated mounting pin, wherein the thickness/diameter T2 of the second portion is larger than the thickness/diameter T1 of the first portion. The second portion of the elongated mounting pin may comprise a through groove (not shown) adapted to receive a part of the plate shaped central portion of the anchor body with almost no play. The central portion of the anchor body is welded to the elongated mounting pin.

Figure 4:
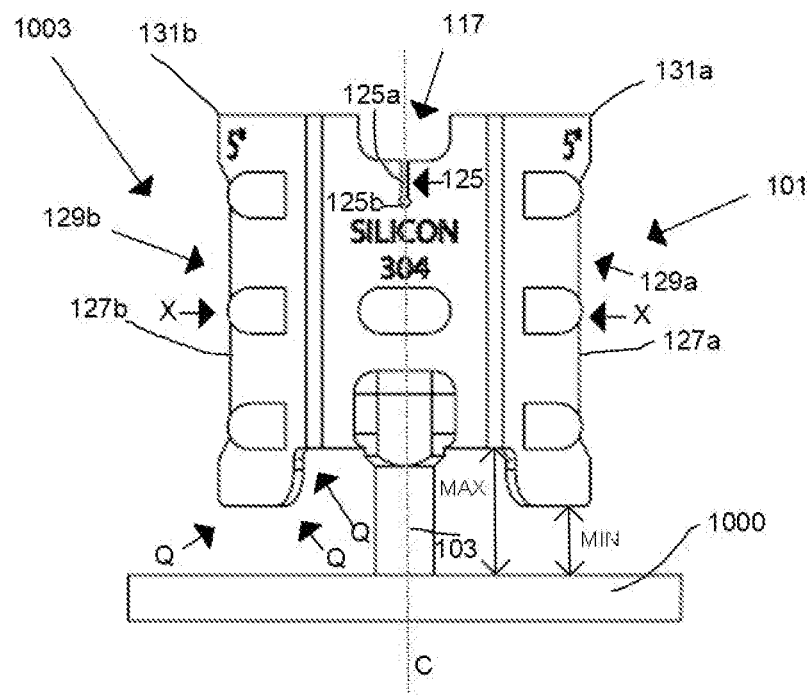
FIG. 4 shows an assembly using a refractory anchor shown in FIG. 3a-c.

The assembly 1001; 1003; 1005; 1007; 1009 comprises an object 1000; 1001' and the refractory anchor 1; 101; 101'; 201; 301; 201'; 201"; 301' which has been welded to the object by stud welding. After installing the assembly as shown in the figures, lining material in liquid form is provided on the assembly to provide a relatively thick liner layer or layers in dual lining, i.e. the thickness of the cured liner is larger than 80 mm, preferably larger than 100 mm. The minimum distance (see FIG. 4 arrows indicated with MIN) between a lower side of the anchor body and the object corresponds at least to the thickness/diameter T1 of the elongated mounting pin, wherein the maximum distance (see FIG. 4 arrows indicated with MAX) between a lower side of the anchor body and the object corresponds at least to two times the thickness/diameter T1 of the elongated mounting pin, preferably the portion of the lower side of the anchor body having the maximum distance to the object is located closer to the elongated mounting pin than the portion of the lower side of the anchor body having the minimum distance to the object.

The refractory anchor 1 shown in FIGS. 1*a-c* and 2 comprises an anchor body 11 having a plurality (three) uniformly spaced side sections 13*a-c*, wherein the plurality of side sections 13*a-c* are connected to the elongated mounting pin 3 by means of a single central portion 9 which has been welded to the second portion 3*b* of the elongated mounting pin 3. In the refractory anchor 1 the side sections 13*a-c* completely or almost completely extend above the second end 7 of the mounting pin 3, wherein the central portion mainly extends above second end 7 of the mounting pin 3. The upper side of the anchor body 11 facing away from the second end of the elongated mounting pin is formed by the three upper sides 15*a-c* of the side sections 13*a-c*. The upper side of the anchor body 11 is provided with an open cut-out 17 which is located directly above the elongated mounting pin 3 seen in the longitudinal direction L of the elongated mounting pin, wherein the open cut-out 17 becomes larger in the direction of the elongated mounting pin. The lower edge 51 of the cut out 17 is mainly provided by a section 53 of the central portion 9, wherein between that section 53 and the elongated mounting pin an endless cut-out part 23 is provided. Between the endless cut-out part 23 and the second end 7 of the elongated mounting pin 3 a further section 55 of the central portion 9 extends. The height of the elongated mounting pin corresponds to or is larger than 40 mm, wherein the height of the anchor body 11 (indicated with arrow E) above the second end of the elongated mounting pin seen in the longitudinal direction of the elongated mounting pin is at least 60 mm, such that the total height B of the refractory anchor is at least 100 mm.

Figure 2:
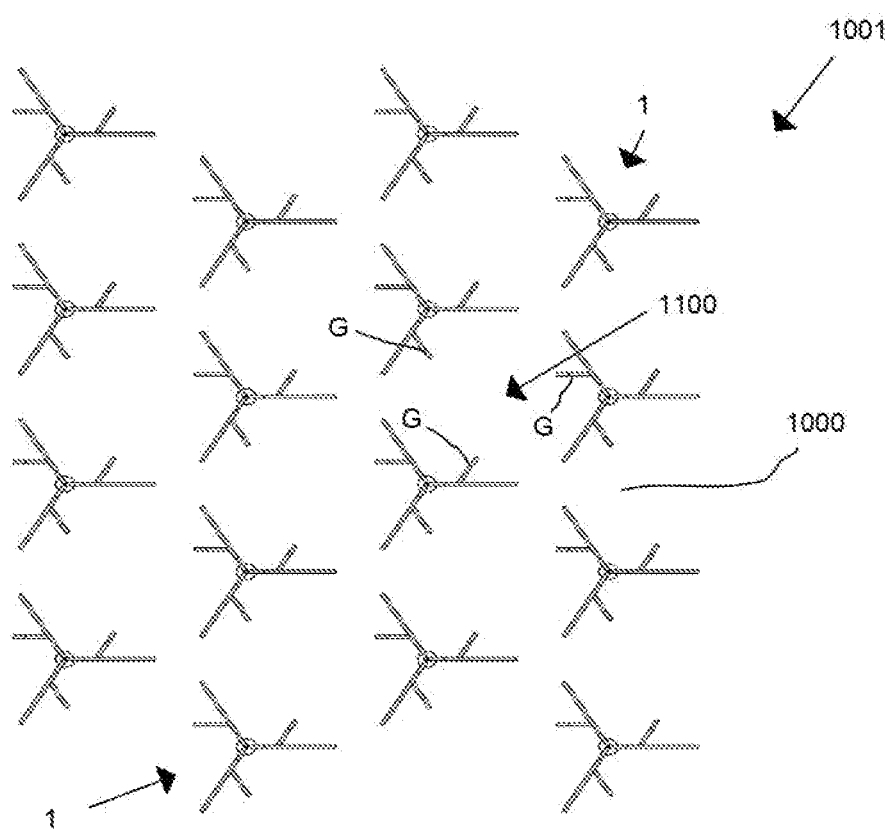
FIG. 2 shows a mounting pattern of an assembly using refractory anchors shown in FIGS. 1a-c.
Figure 3A:
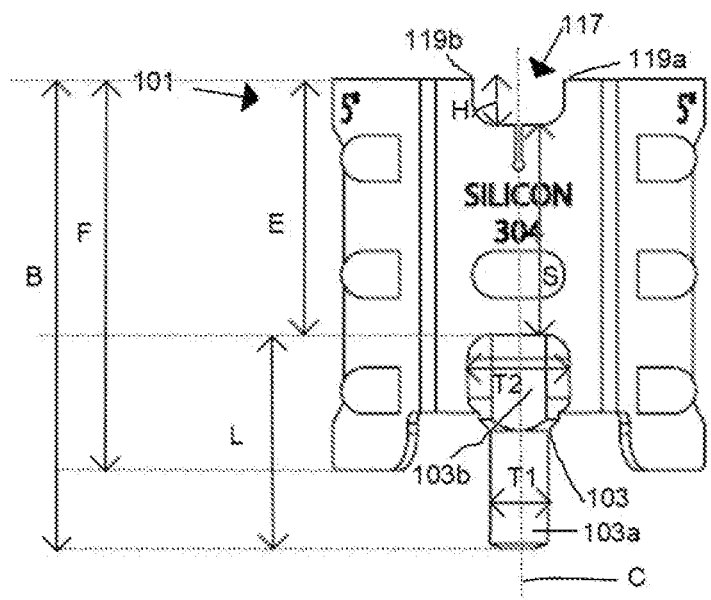
FIGS. 3a, 3b, and 3c show various views of a second embodiment of a refractory anchor.
Figure 3B:
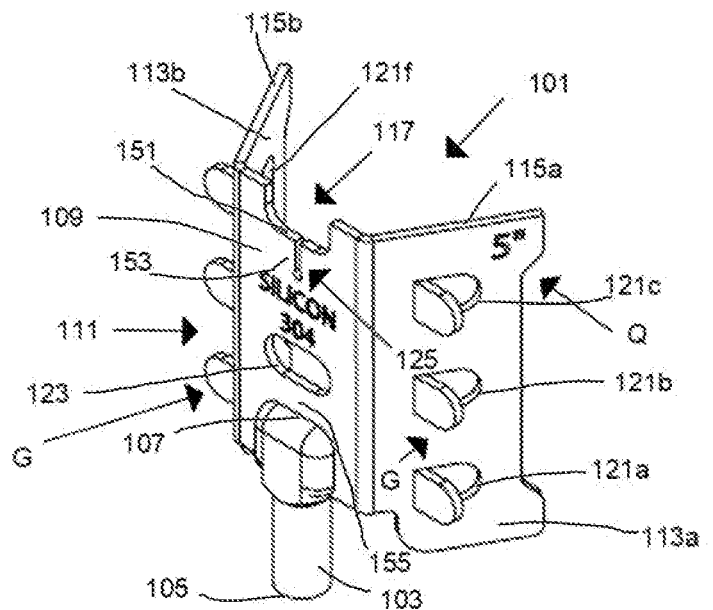
Figure 3C:
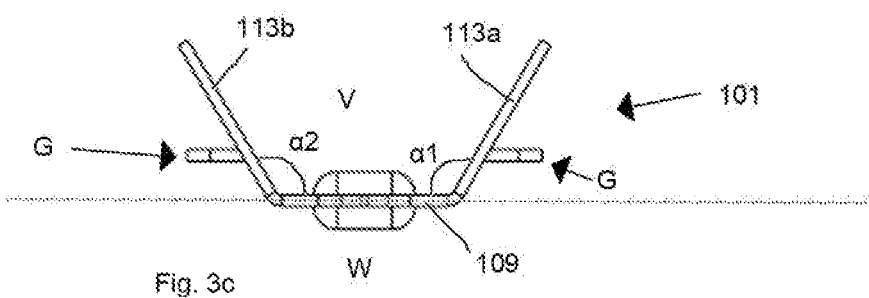

FIG. 2 shows an assembly 1001, wherein an advantageous mounting pattern of the refractory anchors 1 is shown providing excellent anchoring results for a relatively thick liner to be applied on the object 1000. As can be seen three adjacent refractory anchors 1 provide a hexagonal cell 1100 in the assembly 1001, wherein into each hexagonal cell one tab G of each of the three refractory anchors 1 extends for improving anchoring results with the liner.

The refractory anchor 101 shown in FIGS. 3a-c and FIG. 4 comprises an anchor body 111 having two side sections 113a-b, wherein the side sections 113a-b are connected to the elongated mounting pin 103 by means of a single central portion 109 which has been welded to the second portion 103b of the elongated mounting pin 103. The second portion 103b of the elongated mounting pin 103 comprises a through groove (not shown) as discussed above. In the refractory anchor 101 the side sections 113a-b largely extend above the second end 107 of the mounting pin 103, wherein also the central portion 109 largely extends above second end 107 of the mounting pin 103. The upper side of the central portion 109 of the anchor body 111 facing away from the second end of the elongated mounting pin is provided with the open cut-out 117 which is located directly above the elongated mounting pin 103 seen in the longitudinal direction L of the elongated mounting pin. The dimensions of the open cut-out 17 mainly remain constant in the direction of the elongated mounting pin and the cut-out 17 is U-shaped. The lower edge 151 of the cut out 17 is provided by a section 153 of the central portion 109, wherein in the section 153 of the central portion 109 a cut-out extension 125 is provided as discussed above. Between the central portion section 153 and the elongated mounting pin an endless cut-out part 123 is also provided. Between the endless cut-out part 123 and the second end 107 of the elongated mounting pin 103 a further section 155 of the central portion 109 extends. The height of the elongated mounting pin 103 corresponds to or is larger than 40 mm, wherein the height of the anchor body 111 (indicated with arrow E) above the second end of the elongated mounting pin seen in the longitudinal direction of the elongated mounting pin is at least 60 mm, such that the total height B of the refractory anchor 101 is at least 100 mm. More specific, the refractory anchor 101 is a so-called 5 inch anchor, such that the total height B is 5 inch, i.e. 127 mm. In addition, the central portion 109 is located in one virtual plane (indicated by a dotted line in FIG. 3c) which divides the space around the refractory anchor 101 seen in the top view of FIG. 3c in two sides, i.e. in a first side indicated by reference sign V and a second side indicated by reference sign W. The two side sections 113a-b of the anchor body 111 extend in only one of the two sides, i.e. in FIG. 3c the first side indicated with reference sign V. Each side section 113a-b of the anchor body 111 forms an obtuse angle α1, α2 with the central portion 109. The obtuse angles α1, α2 is within a range of 100-150 degrees, preferably approximately 120 degrees. Further, the obtuse angles α1, α2 shown in the figures are substantially identical. The anchor body 111 further has no extensions projecting into the second side W. Each side section 113a-b is also provided with three endless cut-out parts 121a-f and associated tabs G, which may be made in an identical manner as discussed with reference to the first embodiment shown in the FIGS. 1a-c and 2. The tabs G in the refractory anchor 101 extend substantially parallel to the central portion 109.

Figure 5:
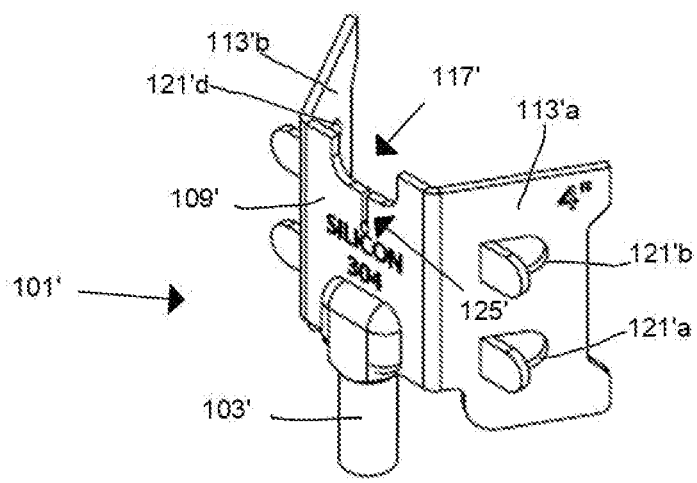
FIG. 5 shows a modification of the second embodiment of the refractory anchor shown in FIGS. 3a, 3b, 3c, and 4, FIGS. 6a and 6b show a front and a top view of a third and a fourth embodiment of a refractory anchor.

FIG. 5 shows a refractory anchor 101' which is almost identical to the refractory anchor 101. The refractory anchor 101' is a so-called 4 inch anchor, such that the total height B is 4 inch, i.e. 102 mm. As a result of the reduced total height, refractory anchor 101' comprises four endless cut-out parts 121'a-d in the side sections, and no endless cut-out part in the central section 109' compared to refractory anchor 101. The refractory anchor 101' further comprises the same or corresponding features as the refractory anchor 101, and for the sake of clarity of FIG. 5 not all the corresponding reference signs are shown in FIG. 5.

Figure 6A:
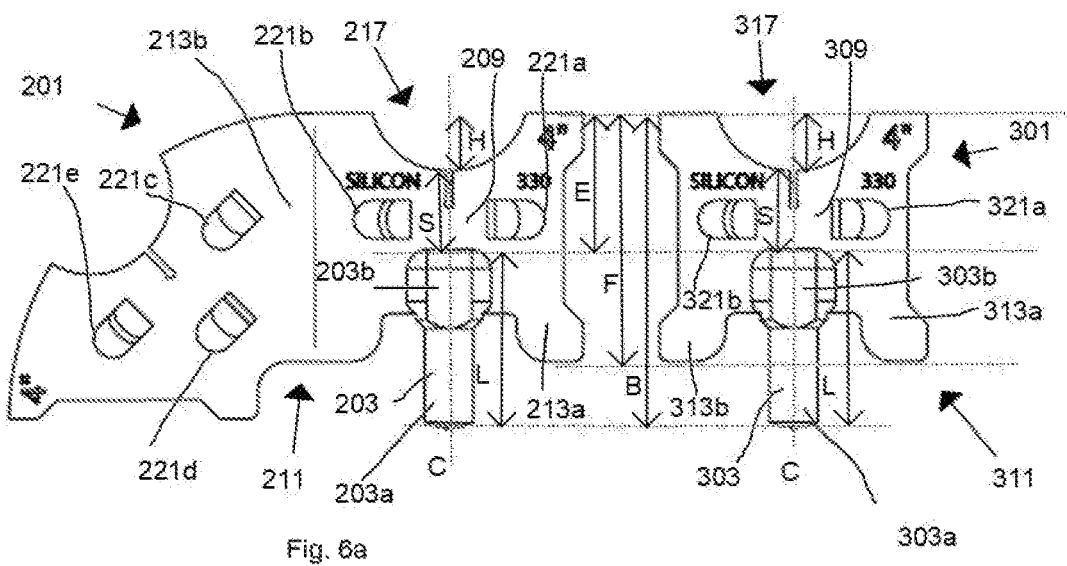
Figure 6B:
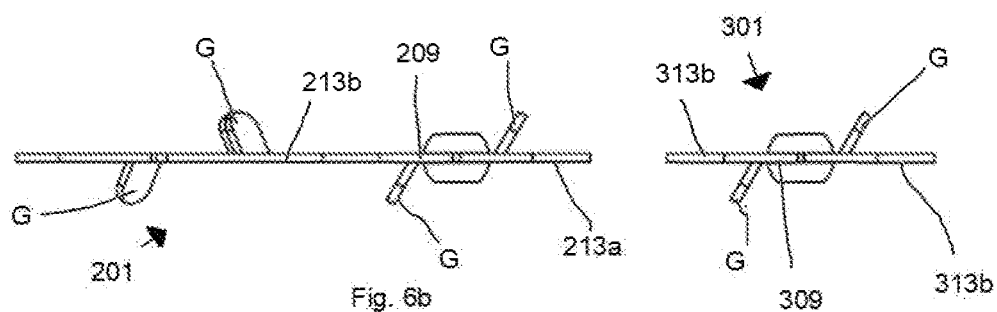
Figure 7:
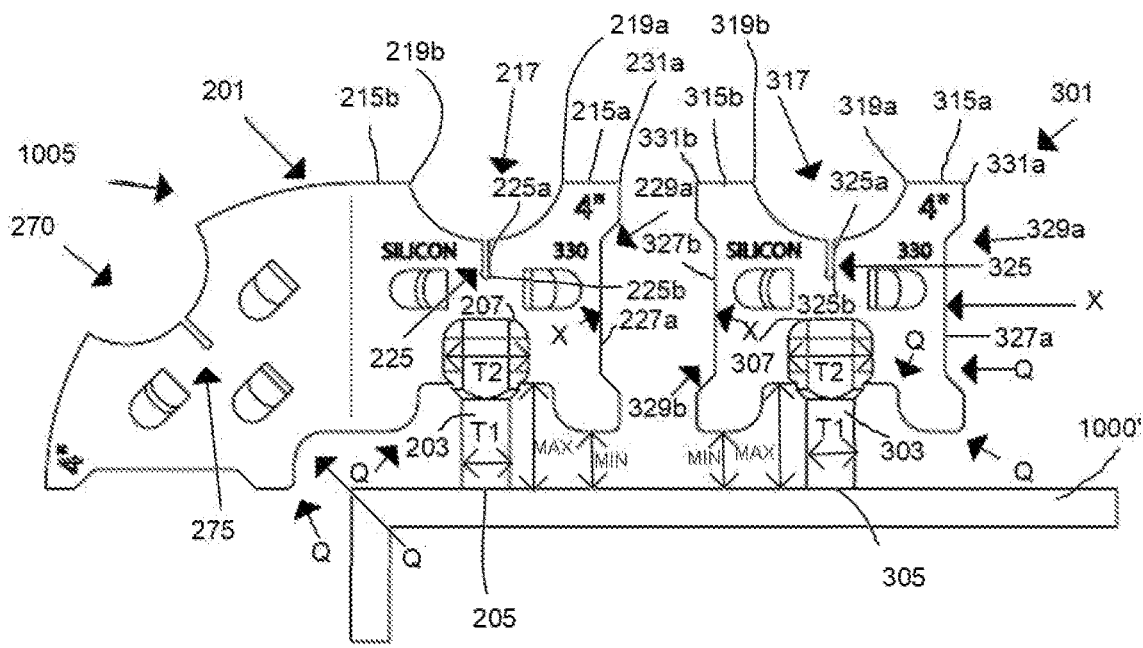
FIG. 7 shows a front view of an assembly using the refractory anchors shown in FIGS. 6a and 6b.

FIG. 6a shows a third 201 and a fourth 301 embodiment of the refractory anchor. Within the designs of the processing equipment, for example a cyclone, there are a lot of edges, corners and transition surfaces. The installation layout can be aligned or off-set, depending on the requirement of the abrasion resistance. The refractory anchor 201 allows smooth transitions on corners, edges and/or transition surfaces and provides excellent liner anchoring results around corners, edges and/or transition surfaces in an object, for example a wall, to be protected. The refractor anchor 301 is used for extending a line of refractory anchors on a relatively flat surface part of the object 1000' as is shown for example in FIG. 7. The refractor anchor 201; 301 comprise a one-piece plate-like anchor body 311 which has a central portion 209; 309 connected to the mounting pin 203; 303 in the same manner as discussed with reference to refractory anchor 101. As can be seen in FIG. 6b the two side sections 213a-b; 313a-b extend from the central portion 209; 309 in one virtual plane and each side section 213a-b; 313a-b comprises at least one endless cut-out parts 221a-e; 321a-b and a corresponding tab G which may be made in an identical manner as discussed with reference to the first embodiment shown in the FIGS. 1a-c and 2. The anchor body 311 of the refractory anchor 301 comprises two substantially identical side sections 313a-b, i.e. with the exception of the tabs G the side sections 313a-b are dimensioned in a mirror-symmetrical manner with respect to the virtual center line of the elongated mounting pin. The anchor body 211 of the refractory anchor 201 comprises one side section 213a which is substantially identical to the side sections 313a and a second side section 213b configured for bridging a corner of the object 1000' as shown in FIG. 7. The upper side 215b and the lower side having corners identified with reference sign Q in FIG. 7 of the second side section 213b have a section with a radius of curvature for bridging a corner, wherein the upper side 215b has a higher radius of curvature than the lower side. Approximately in the middle of curved part of the upper side 215b a further open cut-out 270 is provided with a further cut-out extension 275. The further open cut-out 270 and the further cut-out extension 275 have the same/identical configuration as the open cut-out 217 and the further cut-out extension 225. The further open cut-out 270 and the further cut-out extension 275 provide excellent liner anchoring results of the refractory anchor 201 configured for bridging object corners. The portion of the second side section 213b between the curved upper side 215b and the curved lower side has been provided with additional endless cut-out parts 221c-e with corresponding tabs to further increase the anchoring results.

Figure 8:
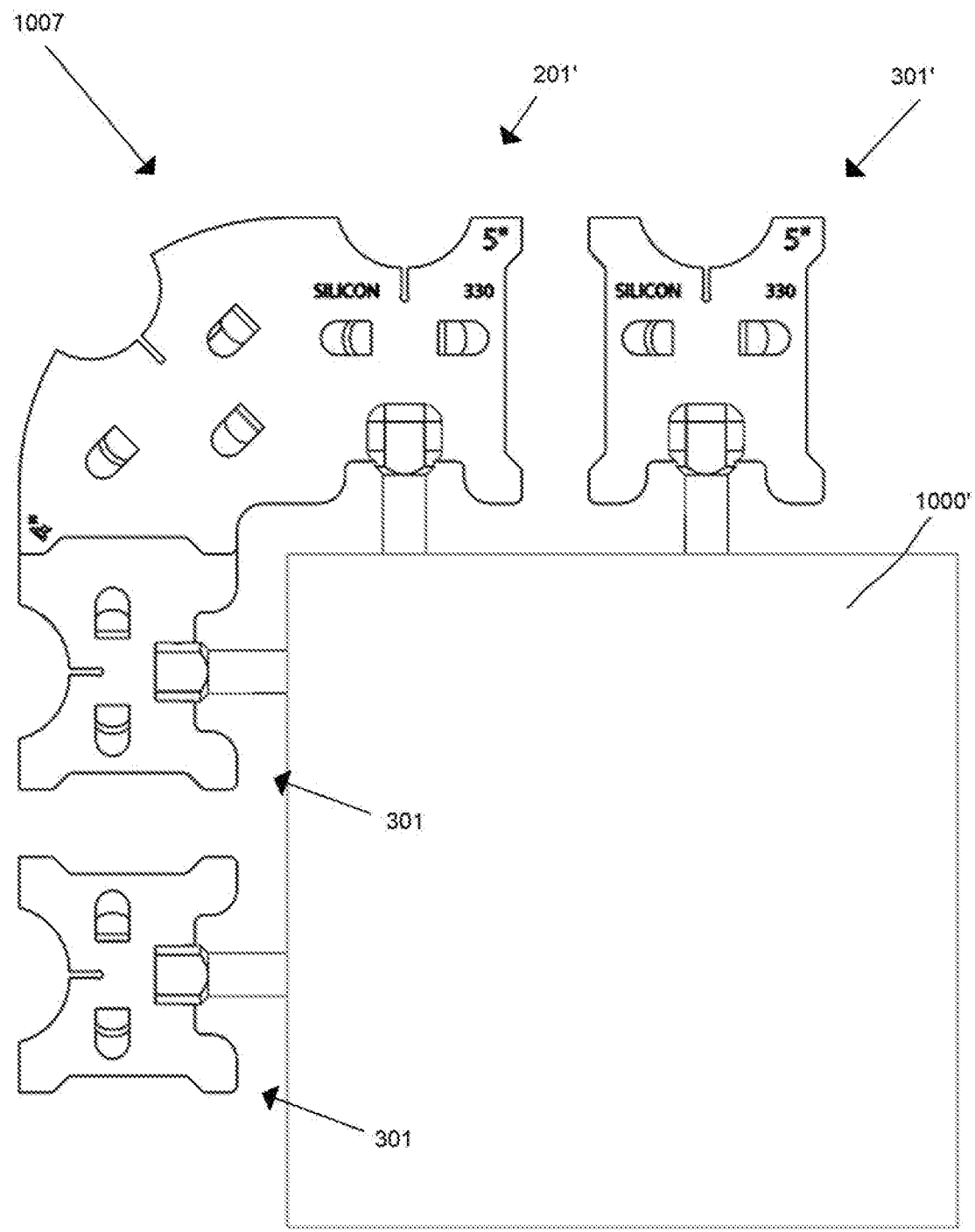
FIG. 8 shows a further example of an assembly comprising refractory anchors shown in FIG. 6a,b with different dimensions.
Figure 9:
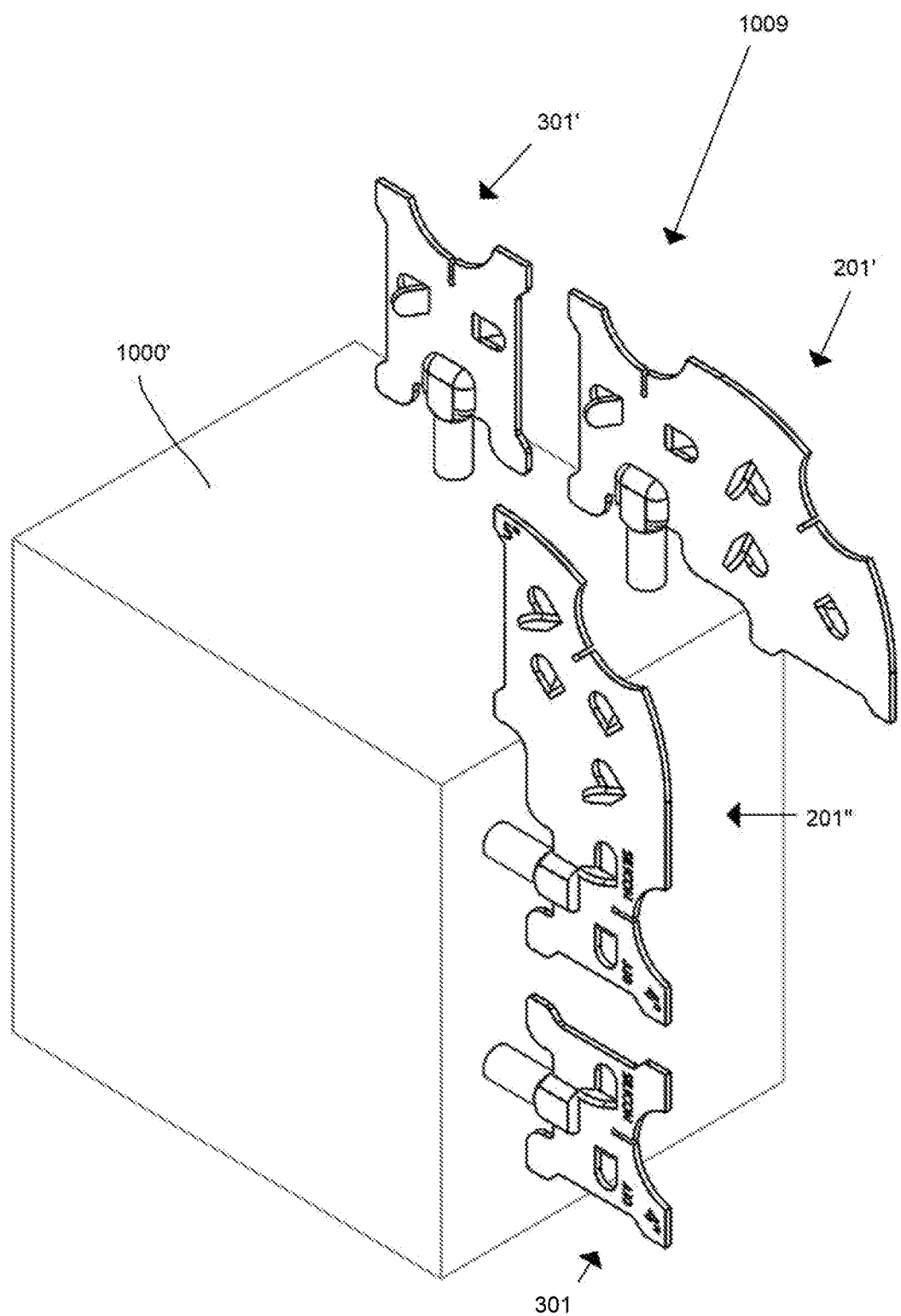
FIG. 9 shows a perspective view of a further example of an assembly comprising refractory anchors shown in FIG. 6a,b with different dimensions.

FIGS. 8 and 9 show a refractory anchor 301' which is almost identical to the refractory anchor 301. The refractory anchor 201 and the refractory anchor 301 shown in FIGS. 6a-b and 7 are so-called 4 inch anchors, such that the total height B is 4 inch, i.e. 102 mm. The refractory anchor 301' shown in FIGS. 8 and 9 is a so-called 5 inch anchor, such that the total height B is 5 inch, i.e. 127 mm. The refractory anchor 301' further comprises the same features as the refractory anchor 301, which features are not individually identified in FIGS. 8 and 9, but reference is made to the same features shown in the FIGS. 6a-b and 7, but then without apostrophe sign.

FIGS. 8 and 9 also show refractory anchors 201'; 201" which are almost identical to the refractory anchor 201, but which are configured for cooperating with a first type of refractory anchor (see refractory anchor 301' (five inch) in FIG. 8) on a first side of an object corner and for cooperating with a second type of refractory anchor (see refractory anchor 301 (four inch) in FIG. 8) on the second side of the object corner. The refractory anchor 201', 202" further comprises the same features as the refractory anchor 201, which features are not individually identified in FIGS. 8 and 9, but reference is made to the same features shown in the FIGS. 6a-b and 7, but then without apostrophe sign(s). As is shown in FIG. 8, the sides of the refractory anchors 201', 301 facing each other can be constructed in such a manner that these sides can be positioned against each other to provide additional support to the refractory anchor 201' and/or to improve the liner anchoring results of the refractory anchors 201'; 301 close to the object corner.

It is also possible that the second portion of the elongated mounting pin comprises more or less the same thickness/diameter (not shown) as the first portion.

The second portion may also be provided with a (screw) thread close to the second end of the elongated mounting pin. The thread may cooperate with a connector having a cooperating (screw) thread, wherein the anchor body and the connector may be made in one-piece.

In a different embodiment (not shown) the second portion is provided without a thread, wherein the connector has a through hole for receiving the second portion without a thread for providing a connection by friction fit, i.e. after positioning the elongated mounting pin into the through hole, a second end of the elongated mounting pin opposite to the end to be welded to the object is subjected to pressure such that a second end section directly located below the second end expands for fixing the second end section inside the through-hole of the connector. The anchor body and the connector may be made in one-piece in this different embodiment.

The invention claimed is:

1. A refractory anchor comprising an elongated mounting pin having a first end and a second end opposite to the first end seen in a longitudinal direction of the elongated mounting pin, wherein the first end of the elongated mounting pin is configured to be weldable to an object, and at least the second end of the elongated mounting pin is connected to a central portion of an anchor body which further comprises at least two side sections extending from the central portion, wherein the central portion and/or at least one of the at least two side sections of the anchor body of the refractory anchor mainly extend above the second end of the elongated mounting pin seen in the longitudinal direction of the elongated mounting pin, wherein an upper side of the anchor body facing away from the second end of the elongated mounting pin is provided with an open cut-out which is located directly above the elongated mounting pin seen in the longitudinal direction of the elongated mounting pin, wherein between the cut-out and the second end of the mounting pin at least a section of the central portion of the anchor body extends.

2. The refractory anchor according to claim 1, wherein a distance between edges of the upper side defining the open cut-out in the anchor body corresponds to or is larger than a thickness/diameter of the elongated mounting pin.

3. The refractory anchor according to claim 1, wherein a center of the open cut-out located at the same level as the upper side of the anchor body coincides with a virtual center line of the elongated mounting pin.

4. The refractory anchor according to claim 1, wherein seen in the longitudinal direction of the elongated mounting pin a height of the cut-out corresponds to or is larger than a thickness/diameter of the elongated mounting pin.

5. The refractory anchor according to claim 1, wherein a thickness/diameter of the elongated mounting pin corresponds to or is larger than 10 mm.

6. The refractory anchor according to claim 1, wherein a maximum height of the anchor body is larger than a height of the elongated mounting pin.

7. The refractory anchor according to claim 1, wherein the anchor body comprises at least one endless cut-out part.

8. The refractory anchor according to claim 1, wherein the central portion of the anchor body is provided with at least one further cut-out located between the open cut-out and the second end of the elongated mounting pin.

9. The refractory anchor according to claim 8, wherein a center of the further cut-out coincides with a virtual center line of the elongated mounting pin.

10. The refractory anchor according to claim 8, wherein the further cut-out is an endless cut-out part and/or the further cut-out is a cut-out extension extending from the open cut-out.

11. The refractory anchor according to claim 10, wherein the cut-out extension has a first elongated section having a minimal width seen in a direction traverse to a virtual center line of the elongated mounting pin, wherein the first elongated section starts from the open cut-out and ends in a second section located closer to the second end of the elongated mounting pin than the first elongated section, wherein the second section has a larger width than the first elongated section.

12. The refractory anchor according to claim 1, wherein a free side of at least one of the two side sections facing away from the elongated mounting pin comprises at least one recess such that the shortest distance between a virtual center line of the elongated mounting pin and a corner between the free side and the upper side is larger than the shortest distance between the virtual center line of the elongated mounting pin and a middle section of the at least one recess.

13. The refractory anchor according to claim 1, wherein at least lower corners of the anchor body are rounded.

14. The refractory anchor according to claim 1, wherein the elongated mounting pin is made from a different material than the anchor body.

15. The refractory anchor according to claim 1, wherein the elongated mounting pin comprises a first portion comprising the first end and a second portion comprising the second end, wherein a thickness/diameter of the second portion is larger than a thickness/diameter of the first portion.

16. The refractory anchor according to claim 15, wherein the second portion of the elongated mounting pin comprises a through groove adapted to receive a part of the central portion of the anchor body with almost no play.

17. The refractory anchor according to claim 1, wherein the central portion of the anchor body is welded to the elongated mounting pin.

18. A method for providing equipment protection, comprising:
providing at least one refractory anchor including an elongated mounting pin having a first end and a second end opposite to the first end seen in a longitudinal direction of the elongated mounting pin, wherein the first end of the elongated mounting pin is configured to be weldable to an object, and at least the second end of the elongated mounting pin is connected to a central portion of an anchor body which further comprises at least two side sections extending from the central portion, wherein the central portion and/or at least one of the at least two side sections of the anchor body of the refractory anchor mainly extend above the second end of the elongated mounting pin seen in the longitudinal direction of the elongated mounting pin, wherein an upper side of the anchor body facing away from the second end of the elongated mounting pin is provided with an open cut-out which is located directly above the elongated mounting pin seen in the longitudinal direction of the elongated mounting pin, wherein between the cut-out and the second end of the mounting pin at least a section of the central portion of the anchor body extends, and connecting the elongated mounting pin of the at least one refractory anchor object by stud welding.

19. The method for providing equipment protection of claim 18, wherein after welding the elongated mounting pin of the at least one refractory anchor to the object, lining material in liquid form is applied to the object, such that the lining material is secured to the object by means of the at least one refractory anchor, wherein the lining material has a density starting from 2.0 g/cm$^3$ and/or starting from 2.5 g/cm$^3$.

20. The method according to claim 19, wherein dual lining is applied to the object to provide a first lining layer mainly for temperature insulation of the object and a second, top liner layer for protection against abrasion, wherein the first lining layer is located closer to the object than the second top liner layer.

21. A refractory anchor comprising an elongated mounting pin having a first end and a second end opposite to the first end seen in a longitudinal direction of the elongated mounting pin, wherein the first end of the elongated mounting pin is configured to be weldable to an object, and at least the second end of the elongated mounting pin is connected to a central portion of an anchor body which further comprises at least two side sections extending from the central portion, wherein the central portion and/or at least one of the at least two side sections of the anchor body of the refractory anchor mainly extend above the second end of the elongated mounting pin seen in the longitudinal direction of the elongated mounting pin, wherein an upper side of the anchor body facing away from the second end of the elongated mounting pin is provided with an open cut-out which is located directly above the elongated mounting pin seen in the longitudinal direction of the elongated mounting pin, wherein a free side of at least one of the two side sections facing away from the elongated mounting pin comprises at least one recess such that the shortest distance between a virtual center line of the elongated mounting pin and a corner between the free side and the upper side is larger than the shortest distance between a virtual center line of the elongated mounting pin and a middle section of the at least one recess.

22. A refractory anchor comprising an elongated mounting pin having a first end and a second end opposite to the first end seen in the longitudinal direction of the elongated mounting pin, wherein the first end of the elongated mounting pin is configured to be weldable to an object, and at least the second end of the elongated mounting pin is connected to a central portion of an anchor body which further comprises at least two side sections extending from the central portion, wherein the central portion and/or at least one of the at least two side sections of the anchor body of the refractory anchor mainly extend above the second end of the elongated mounting pin seen in the longitudinal direction of the elongated mounting pin, wherein an upper side of the anchor body facing away from the second end of the elongated mounting pin is provided with an open cut-out which is located directly above the elongated mounting pin seen in the longitudinal direction of the elongated mounting pin, wherein the elongated mounting pin comprises a first portion comprising the first end and a second portion comprising the second end, wherein a thickness/diameter of the second portion is larger than a thickness/diameter of the first portion, wherein the second portion of the elongated mounting pin comprises a through groove adapted to receive a part of the central portion of the anchor body with almost no play.

* * * * *